United States Patent
Pai et al.

(10) Patent No.: US 9,769,214 B2
(45) Date of Patent: Sep. 19, 2017

(54) PROVIDING RELIABLE SESSION INITIATION PROTOCOL (SIP) SIGNALING FOR WEB REAL-TIME COMMUNICATIONS (WEBRTC) INTERACTIVE FLOWS, AND RELATED METHODS, SYSTEMS, AND COMPUTER-READABLE MEDIA

(71) Applicant: Avaya Inc., Basking Ridge, NJ (US)

(72) Inventors: Deep Subhash Pai, Pune (IN); Vipul Rastogi, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 936 days.

(21) Appl. No.: 14/071,896

(22) Filed: Nov. 5, 2013

(65) Prior Publication Data
US 2015/0127709 A1 May 7, 2015

(51) Int. Cl.
*G06F 15/16* (2006.01)
*H04L 12/66* (2006.01)
(Continued)

(52) U.S. Cl.
CPC ........ *H04L 65/1006* (2013.01); *H04L 67/142* (2013.01); *H04L 29/06027* (2013.01)

(58) Field of Classification Search
CPC ... H04L 65/10–65/1096; H04L 67/14–67/148; H04L 29/06027
See application file for complete search history.

(56) References Cited

U.S. PATENT DOCUMENTS 6,714,967 B1 3/2004 Horvitz
7,107,316 B2 9/2006 Brown et al.
(Continued)

FOREIGN PATENT DOCUMENTS

EP 1615386 A1 1/2006
EP 2529316 A2 12/2012
(Continued)

OTHER PUBLICATIONS

Barth, Adam. "HTTP state management mechanism." (2011).*
(Continued)

*Primary Examiner* — David Lazaro
*Assistant Examiner* — Julian Chang
(74) *Attorney, Agent, or Firm* — Sheridan Ross P.C.

(57) ABSTRACT

Embodiments include providing reliable Session Initiation Protocol (SIP) signaling for Web Real Time Communications (WebRTC) interactive flows, and related methods, systems, and computer-readable media. In one embodiment, a method for providing reliable SIP signaling for WebRTC interactive flows comprises establishing, via a stateless SIP user agent executing on a first web server, a WebRTC interactive flow between a WebRTC client executing on a computing device and a remote endpoint. The method further comprises receiving, by the WebRTC client, a call state from the stateless SIP user agent, the call state indicating a current state of the WebRTC interactive flow. The method also comprises storing, by the WebRTC client, the call state. In this manner, the call state of the WebRTC interactive flow may be accessible for restoring the WebRTC interactive flow in the event of an unexpected termination of the WebRTC client and/or the stateless SIP user agent.

20 Claims, 9 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 7,145,898 B1 | 12/2006 | Elliott | |
| 7,266,591 B1 | 9/2007 | Johnston | |
| 7,379,993 B2 | 5/2008 | Valdes et al. | |
| 7,636,348 B2 | 12/2009 | Bettis et al. | |
| 7,661,027 B2* | 2/2010 | Langen | G06F 11/2028 |
| | | | 714/15 |
| 7,730,309 B2 | 6/2010 | Zimmermann | |
| 8,015,484 B2 | 9/2011 | Backer | |
| 8,036,360 B1* | 10/2011 | Gogineni | H04M 3/42374 |
| | | | 379/207.04 |
| 8,250,635 B2 | 8/2012 | Chari et al. | |
| 8,300,632 B2 | 10/2012 | Davis et al. | |
| 8,467,308 B2 | 6/2013 | Johnston | |
| 8,494,507 B1 | 7/2013 | Tedesco et al. | |
| 8,601,144 B1 | 12/2013 | Ryner | |
| 8,605,711 B1 | 12/2013 | Sinnreich et al. | |
| 8,606,950 B2 | 12/2013 | Glatron et al. | |
| 8,693,392 B2 | 4/2014 | Cooper et al. | |
| 8,695,077 B1* | 4/2014 | Gerhard | H04L 63/0815 |
| | | | 726/8 |
| 8,737,596 B2 | 5/2014 | Kelley et al. | |
| 8,744,147 B2 | 6/2014 | Torti | |
| 8,832,271 B2 | 9/2014 | McCarty | |
| 8,856,236 B2 | 10/2014 | Moore et al. | |
| 8,861,692 B1 | 10/2014 | Phelps et al. | |
| 8,867,731 B2 | 10/2014 | Lum et al. | |
| 9,331,967 B2* | 5/2016 | Gangadharan | H04L 51/04 |
| 2002/0019846 A1* | 2/2002 | Miloslavsky | G06F 11/1008 |
| | | | 709/206 |
| 2002/0161685 A1 | 10/2002 | Dwinnell | |
| 2003/0112766 A1 | 6/2003 | Riedel et al. | |
| 2003/0120599 A1 | 6/2003 | Agboatwalla et al. | |
| 2003/0131245 A1 | 7/2003 | Linderman | |
| 2003/0188193 A1 | 10/2003 | Venkataramappa | |
| 2004/0019494 A1 | 1/2004 | Ridgeway et al. | |
| 2004/0081173 A1 | 4/2004 | Feather | |
| 2004/0093515 A1 | 5/2004 | Reeves, Jr. | |
| 2004/0167984 A1 | 8/2004 | Herrmann | |
| 2004/0216173 A1 | 10/2004 | Horoszowski et al. | |
| 2005/0084082 A1 | 4/2005 | Horvitz et al. | |
| 2005/0177380 A1 | 8/2005 | Pritchard et al. | |
| 2005/0204148 A1* | 9/2005 | Mayo | H04L 63/0815 |
| | | | 713/185 |
| 2006/0104526 A1 | 5/2006 | Gringeler et al. | |
| 2006/0155814 A1 | 7/2006 | Bennett et al. | |
| 2006/0159063 A1 | 7/2006 | Kumar | |
| 2006/0200855 A1 | 9/2006 | Willis | |
| 2006/0230438 A1 | 10/2006 | Shappir et al. | |
| 2007/0083929 A1 | 4/2007 | Sprosts et al. | |
| 2007/0143408 A1 | 6/2007 | Daigle | |
| 2007/0255662 A1 | 11/2007 | Tumminaro | |
| 2007/0283423 A1 | 12/2007 | Bradley et al. | |
| 2008/0046414 A1 | 2/2008 | Haub et al. | |
| 2008/0046457 A1 | 2/2008 | Haub et al. | |
| 2008/0046838 A1 | 2/2008 | Haub et al. | |
| 2008/0127137 A1 | 5/2008 | Becker et al. | |
| 2008/0144804 A1* | 6/2008 | Mergen | H04M 3/5166 |
| | | | 379/266.1 |
| 2008/0147551 A1* | 6/2008 | Connelly | G06Q 20/10 |
| | | | 705/44 |
| 2008/0162642 A1 | 7/2008 | Bachiri et al. | |
| 2008/0183991 A1* | 7/2008 | Cosmadopoulos | G06F 11/2097 |
| | | | 711/162 |
| 2008/0189421 A1* | 8/2008 | Langen | H04L 29/06 |
| | | | 709/227 |
| 2008/0192646 A1 | 8/2008 | Song et al. | |
| 2008/0270541 A1 | 10/2008 | Keener et al. | |
| 2008/0282254 A1* | 11/2008 | Blander | H04L 67/1029 |
| | | | 718/105 |
| 2008/0317233 A1* | 12/2008 | Rey | H04M 3/4938 |
| | | | 379/210.01 |
| 2009/0070477 A1 | 3/2009 | Baum et al. | |
| 2009/0094684 A1 | 4/2009 | Chinnusamy et al. | |
| 2009/0217109 A1* | 8/2009 | Sekaran | H04L 41/147 |
| | | | 714/49 |
| 2009/0252159 A1* | 10/2009 | Lawson | H04M 7/0021 |
| | | | 370/352 |
| 2009/0300060 A1 | 12/2009 | Beringer et al. | |
| 2010/0011282 A1 | 1/2010 | Dollard et al. | |
| 2010/0023519 A1 | 1/2010 | Kailash et al. | |
| 2010/0024019 A1 | 1/2010 | Backlund | |
| 2010/0037324 A1 | 2/2010 | Grant et al. | |
| 2010/0118700 A1 | 5/2010 | Blum et al. | |
| 2010/0150139 A1* | 6/2010 | Lawson | H04L 12/66 |
| | | | 370/352 |
| 2010/0246571 A1 | 9/2010 | Geppert et al. | |
| 2011/0072144 A1* | 3/2011 | Fikouras | H04L 65/1016 |
| | | | 709/230 |
| 2011/0078319 A1* | 3/2011 | Ishida | H04L 65/1063 |
| | | | 709/228 |
| 2011/0081008 A1* | 4/2011 | Lawson | H04M 15/41 |
| | | | 379/114.03 |
| 2011/0099277 A1* | 4/2011 | Yao | G06F 17/30873 |
| | | | 709/226 |
| 2011/0102930 A1 | 5/2011 | Johnston et al. | |
| 2011/0176537 A1* | 7/2011 | Lawson | H04L 65/1069 |
| | | | 370/352 |
| 2011/0206013 A1 | 8/2011 | Aramoto et al. | |
| 2011/0238862 A1 | 9/2011 | Chaturvedi et al. | |
| 2011/0283259 A1* | 11/2011 | Lawson | G06F 8/61 |
| | | | 717/121 |
| 2012/0001932 A1 | 1/2012 | Burnett et al. | |
| 2012/0036180 A1* | 2/2012 | Thornton | H04L 67/1023 |
| | | | 709/203 |
| 2012/0079031 A1 | 3/2012 | Matthews et al. | |
| 2012/0137231 A1 | 5/2012 | Maxfield et al. | |
| 2012/0158862 A1 | 6/2012 | Mosko et al. | |
| 2012/0192086 A1 | 7/2012 | Ghods et al. | |
| 2013/0002799 A1 | 1/2013 | Mock | |
| 2013/0067102 A1* | 3/2013 | Paller | H04L 65/105 |
| | | | 709/228 |
| 2013/0078972 A1 | 3/2013 | Levien et al. | |
| 2013/0091286 A1 | 4/2013 | Spencer | |
| 2013/0128883 A1* | 5/2013 | Lawson | H04M 1/2473 |
| | | | 370/352 |
| 2013/0138829 A1 | 5/2013 | Bulava | |
| 2013/0163580 A1* | 6/2013 | Vass | H04L 65/104 |
| | | | 370/352 |
| 2013/0246563 A1* | 9/2013 | Cardozo | G06F 17/30876 |
| | | | 709/217 |
| 2013/0297738 A1* | 11/2013 | Tarkoma | G06F 17/30958 |
| | | | 709/217 |
| 2013/0321340 A1 | 12/2013 | Seo et al. | |
| 2013/0325934 A1 | 12/2013 | Fausak et al. | |
| 2013/0346329 A1 | 12/2013 | Alib-Bulatao et al. | |
| 2014/0013202 A1 | 1/2014 | Schlumberger | |
| 2014/0019626 A1* | 1/2014 | Hubler | H04L 65/1006 |
| | | | 709/227 |
| 2014/0043994 A1 | 2/2014 | Bansal et al. | |
| 2014/0064467 A1* | 3/2014 | Lawson | H04M 15/43 |
| | | | 379/114.03 |
| 2014/0095633 A1 | 4/2014 | Yoakum | |
| 2014/0095724 A1 | 4/2014 | Yoakum et al. | |
| 2014/0095731 A1 | 4/2014 | Carey et al. | |
| 2014/0108594 A1 | 4/2014 | Siegel et al. | |
| 2014/0126708 A1 | 5/2014 | Sayko | |
| 2014/0126714 A1* | 5/2014 | Sayko | H04M 3/5191 |
| | | | 379/265.09 |
| 2014/0126715 A1* | 5/2014 | Lum | H04M 3/5133 |
| | | | 379/265.09 |
| 2014/0143823 A1 | 5/2014 | Manchester et al. | |
| 2014/0149512 A1 | 5/2014 | Leitch | |
| 2014/0161237 A1 | 6/2014 | Tolksdorf | |
| 2014/0201820 A1 | 7/2014 | Li et al. | |
| 2014/0219167 A1 | 8/2014 | Santhanam et al. | |

(56) References Cited

U.S. PATENT DOCUMENTS

| | | | |
|---|---|---|---|
| 2014/0222893 A1* | 8/2014 | Gangadharan | H04L 65/1016 709/203 |
| 2014/0222894 A1* | 8/2014 | Gangadharan | H04L 67/02 709/203 |
| 2014/0222930 A1* | 8/2014 | Gangadharan | H04L 51/04 709/206 |
| 2014/0222957 A1* | 8/2014 | Gangadharan | H04L 67/141 709/217 |
| 2014/0222963 A1* | 8/2014 | Gangadharan | H04L 65/1016 709/219 |
| 2014/0223452 A1* | 8/2014 | Santhanam | H04L 67/141 719/328 |
| 2014/0237057 A1 | 8/2014 | Khodorenko | |
| 2014/0241215 A1 | 8/2014 | Massover et al. | |
| 2014/0244235 A1 | 8/2014 | Michaelis | |
| 2014/0245143 A1 | 8/2014 | Saint-Marc | |
| 2014/0258822 A1 | 9/2014 | Li et al. | |
| 2014/0269326 A1 | 9/2014 | Westin et al. | |
| 2014/0270104 A1 | 9/2014 | O'Connor | |
| 2014/0280734 A1 | 9/2014 | Chaturvedi et al. | |
| 2014/0280995 A1* | 9/2014 | Ezell | H04L 65/1016 709/229 |
| 2014/0282054 A1 | 9/2014 | Yoakum | |
| 2014/0282135 A1 | 9/2014 | Segre | |
| 2014/0282399 A1 | 9/2014 | Gorelik et al. | |
| 2014/0282765 A1 | 9/2014 | Casey et al. | |
| 2014/0282903 A1* | 9/2014 | Singh | H04L 63/08 726/4 |
| 2014/0324979 A1 | 10/2014 | Gao et al. | |
| 2014/0325078 A1* | 10/2014 | Shan | H04W 36/0066 709/227 |
| 2014/0330976 A1* | 11/2014 | van Bemmel | H04L 67/1023 709/226 |
| 2014/0330977 A1* | 11/2014 | van Bemmel | H04L 69/22 709/226 |
| 2014/0344169 A1 | 11/2014 | Phelps et al. | |
| 2014/0348044 A1* | 11/2014 | Narayanan | H04L 65/1016 370/310 |
| 2014/0359004 A1* | 12/2014 | Zhou | H04L 61/2575 709/203 |
| 2014/0365676 A1 | 12/2014 | Yoakum | |
| 2014/0379823 A1* | 12/2014 | Wilsher | H04L 12/287 709/206 |
| 2014/0379931 A1 | 12/2014 | Gaviria | |
| 2015/0002614 A1 | 1/2015 | Zino et al. | |
| 2015/0002619 A1 | 1/2015 | Johnston et al. | |
| 2015/0006610 A1* | 1/2015 | Johnston | H04L 65/103 709/202 |
| 2015/0006611 A1 | 1/2015 | Johnston et al. | |
| 2015/0006741 A1* | 1/2015 | Narayanan | H04L 69/40 709/227 |
| 2015/0026473 A1 | 1/2015 | Johnston et al. | |
| 2015/0036690 A1 | 2/2015 | Pastro | |
| 2015/0039687 A1 | 2/2015 | Waxman et al. | |
| 2015/0039760 A1 | 2/2015 | Yoakum | |
| 2015/0052067 A1 | 2/2015 | Thiyagarajan et al. | |
| 2015/0106528 A1* | 4/2015 | Somes | H04L 67/141 709/228 |
| 2015/0180825 A1* | 6/2015 | Ren | H04L 61/2564 709/228 |
| 2015/0229635 A1* | 8/2015 | Saridaki | H04L 65/1006 726/8 |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

Singh, Kundan, and Henning Schulzrinne. "Failover, load sharing and server architecture in SIP telephony." Computer Communications 30.5 (2007): 927-942.*

Singh, Kundan Narendra. Reliable, scalable and interoperable internet telephony. Diss. Columbia University, 2006.*

Marwah, Manish, et al. "Efficient, scalable migration of IP telephony calls for enhanced fault-tolerance." Proceedings. 14th International Conference on Computer Communications and Networks, 2005. ICCCN 2005.. IEEE, 2005.*

Johnston, Alan et al., "Taking on WebRTC in an Enterprise," IEEE Communications Magazine, Apr. 2013, pp. 48-54, vol. 51, Issue 4.

Search Report for British patent application GB1317121.0 mailed Mar. 14, 2014, 3 pages.

Search Report for British patent application GB1317122.8 mailed Mar. 11, 2014, 3 pages.

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.

Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.

Berners-Lee, Tim, "Socially Aware Cloud Storage," Notes on web design, Aug. 17, 2009, http://www.w3.org/DesignIssues/CloudStorage.html, 9 pages.

Chandra, Ramesh et al., "Separating Web Applications from User Data Storage with BStore," presented at the USENIX Conference on Web Application Development, Jun. 2010, Boston, Massachusettes, 13 pages.

Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.

Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.

Hsu, F. et al., "Secure File System Services for Web 2.0 Applications," presented at the ACM Cloud Computing Security Workshop, Nov. 13, 2009, Chicago, Illinois, Association for Computing Machinery, 7 pages.

Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.

Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.

Non-Final Office Action for U.S. Appl. No. 14/037,440, mailed Sep. 12, 2014, 15 pages.

Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.

Search Report for British patent application GB1411584.4 mailed Dec. 30, 2014, 4 pages.

Search Report for British patent application GB1411580.2 mailed Dec. 30, 2014, 4 pages.

Non-Final Office Action for U.S. Appl. No. 13/931,968, mailed Dec. 8, 2014, 6 pages.

Non-Final Office Action for U.S. Appl. No. 13/835,913, mailed Nov. 20, 2014, 15 pages.

(56) References Cited

OTHER PUBLICATIONS

Non-Final Office Action for U.S. Appl. No. 13/803,292, mailed Jan. 27, 2015, 13 pages.
Non-Final Office Action for U.S. Appl. No. 14/050,891, mailed Jan. 29, 2015, 9 pages.
Non-Final Office Action for U.S. Appl. No. 13/955,023, mailed Feb. 2, 2015, 12 pages.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Barth, A. "The Web Origin Concept," Internet Engineering Task Force (IETF), Request for Comments 6454 (RFC 6454), Dec. 2011, 19 pages, http://www.ietf.org/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Search Report for British Patent Application GB1419338.7, mailed Apr. 27, 2015, 4 pages.
Search Report for British Patent Application GB1419334.6, mailed Apr. 28, 2015, 6 pages.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Non-Final Office Action for U.S. Appl. No. 13/931,970, mailed May 7, 2015, 9 pages.
Bergkvist, Adam et al., "WebRTC 1.0: Real-time Communication Between Browsers," W3C Working Draft, Feb. 9, 2012, http://www.w3.org)TR/2012/WD-webrtc-20120209/, 42 pages.
Notice of Reason for Refusal for Japanese Patent Application 2013-201228, dispatched Jun. 11, 2015, 8 pages.
Advisory Action for U.S. Appl. No. 13/835,913, mailed Jun. 10, 2015, 3 pages.
Final Office Action for U.S. Appl. No. 13/803,292, mailed Jun. 12, 2015, 17 pages.
Final Office Action and Examiner Initiated Interview Summary for U.S. Appl. No. 14/050,891, mailed Jun. 29, 2015, 11 pages.
Final Office Action for U.S. Appl. No. 13/955,023, mailed Jul. 20, 2015, 17 pages.
Corrected Notice of Allowability for U.S. Appl. No. 13/944,368, mailed Jul. 23, 2015, 4 pages.
Non-Final Office Action for U.S. Appl. No. 14/141,798, mailed Jul. 17, 2015, 13 pages.
Extended European Search Report for European Patent Application 15161452.6, mailed Jun. 23, 2015, 5 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Examination Report for British Patent Application GB1411584.4, mailed Aug. 21, 2015, 1 page.
Examination Report for British Patent Application GB1411580.2, mailed Aug. 21, 2015, 1 page.
Notification of Reasons for Refusal for Japanese Patent Application 2013-201221, mailed Aug. 25, 2015, 8 pages.
Non-Final Office Action for U.S. Appl. No. 13/835,913, mailed Sep. 3, 2015, 19 pages.
Non-Final Office Action for U.S. Appl. No. 13/912,520, mailed Sep. 9, 2015, 21 pages.
Non-Final Office Action for U.S. Appl. No. 13/863,662, mailed Sep. 25, 2015, 23 pages.
Advisory Action for U.S. Appl. No. 13/803,292, mailed Aug. 21, 2015, 3 pages.
Non-Final Office Action for U.S. Appl. No. 13/803,292, mailed Oct. 9, 2015, 13 pages.
Advisory Action and Examiner-Initiated Interview Summary for U.S. Appl. No. 14/050,891, mailed Sep. 29, 2015, 4 pages.
Final Office Action for U.S. Appl. No. 14/068,839, mailed Sep. 9, 2015, 17 pages.
Final Office Action for U.S. Appl. No. 13/931,967, mailed Aug. 20, 2015, 12 pages.
Final Office Action for U.S. Appl. No. 13/931,970, mailed Aug. 27, 2015, 10 pages.
Non-Final Office Action for U.S. Appl. No. 13/955,711, mailed Nov. 9, 2015, 10 pages.
Notice of Allowance for U.S. Appl. No. 14/050,891, mailed Nov. 10, 2015, 10 pages.
Non-Final Office Action for U.S. Appl. No. 13/955,023, mailed Dec. 9, 2015, 13 pages.
Non-Final Office Action for U.S. Appl. No. 14/037,440, mailed Oct. 22, 2015, 15 pages.
Advisory Action for U.S Appl. No. 13/931,967, mailed Nov. 3, 2015, 3 pages.
Advisory Action for U.S Appl. No. 13/931,970, mailed Nov. 5, 2015, 3 pages.
Non-Final Office Action for U.S. Appl. No. 14/068,943, mailed Dec. 2, 2015, 16 pages.
Non-Final Office Action for U.S. Appl. No. 14/255,429, mailed Nov. 9, 2015, 26 pages.
Search Report for British Patent Application No. GB1423089.0, mailed Jul. 6, 2015, 4 pages.
Author Unknown, "WebRTC," WebRTC.org, Date Accessed: Jan. 26, 2016, 4 pages, http://webrtc.org/.
Notice of Allowance for U.S. Appl. No. 13/863,662, mailed Feb. 1, 2016, 17 pages.
Advisory Action and Examiner-Initiated Interview Summary for U.S. Appl. No. 14/068,839, mailed Feb. 12, 2016, 4 pages.
Final Office Action for U.S. Appl. No. 14/141,798, mailed Dec. 24, 2015, 10 pages.
Non-Final Office Action for U.S. Appl. No. 14/174,371, mailed Feb. 18, 2016, 18 pages.
Non-Final Office Action for U.S. Appl. No. 13/931,970, mailed Feb. 23, 2016, 11 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Many et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol

(56) References Cited

OTHER PUBLICATIONS (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.

* cited by examiner

PROVIDING RELIABLE SESSION INITIATION PROTOCOL (SIP) SIGNALING FOR WEB REAL-TIME COMMUNICATIONS (WEBRTC) INTERACTIVE FLOWS, AND RELATED METHODS, SYSTEMS, AND COMPUTER-READABLE MEDIA

BACKGROUND

Field of the Disclosure

The technology of the disclosure relates generally to Web Real-Time Communications (WebRTC) interactive sessions utilizing Session Initiation Protocol (SIP) signaling.

Technical Background

Web Real-Time Communications (WebRTC) is an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hyper Text Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, $2^{nd}$ Edition (2013 Digital Codex LLC), which is incorporated in its entirety herein by reference.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www.ietf.org.

In a typical WebRTC exchange, two WebRTC clients retrieve WebRTC web applications, such as HTML5/JavaScript web applications, from a web application server. Through the web applications, the two WebRTC clients engage in an initiation dialogue for initiating a peer connection over which a WebRTC interactive flow (e.g., a real-time video, audio, and/or data exchange) will pass. This initiation dialogue may include a media negotiation used to communicate and reach an agreement on parameters that define characteristics of the WebRTC interactive flow. In some embodiments, the media negotiation may be implemented via a WebRTC offer/answer exchange (using, e.g., Session Description Protocol (SDP) objects) via a secure network connection such as a Hyper Text Transfer Protocol Secure (HTTPS) connection or a Secure WebSockets connection. Once the initiation dialogue is complete, the WebRTC clients may then establish a direct peer connection with one another, and may begin an exchange of media or data packets transporting real-time communications.

While WebRTC provides the media capabilities necessary for real-time communications, it does not specify a call signaling mechanism to be used for a WebRTC interactive flow. Accordingly, the responsibility for implementing call signaling for the WebRTC interactive flow falls to the WebRTC web application. One approach for call signaling is to employ a Session Initiation Protocol (SIP) user agent, implemented either at a WebRTC endpoint or at an intermediate web server. However, a SIP user agent implemented at a WebRTC endpoint may require the use of client-side scripting code that may be viewed and/or manipulated by an end user. As a result, intellectual property within the SIP user agent may be compromised, or the code constituting the SIP user agent may be manipulated for malicious purposes. A SIP user agent implemented at an intermediate web server may avoid these issues, but may introduce new challenges. For instance, the SIP user agent at the web server may need to constantly maintain a state of an ongoing WebRTC communication. This may violate the stateless nature of the web server, and may result in load-balancing and/or reliability problems for the web server.

SUMMARY OF THE DETAILED DESCRIPTION

Embodiments disclosed in the detailed description provide reliable Session Initiation Protocol (SIP) signaling for Web Real-Time Communications (WebRTC) interactive flows. Related methods, systems, and computer-readable media are also disclosed. In this regard, some embodiments disclosed herein provide a WebRTC client comprising a call state management agent working in conjunction with a stateless SIP user agent to provide reliable SIP signaling. The WebRTC client may establish a WebRTC interactive flow with a remote endpoint, using the stateless SIP user agent to handle call signaling. As the WebRTC interactive flow progresses, the stateless SIP user agent may generate a call state that encapsulates a current state of the WebRTC interactive flow. The call state management agent may receive the call state from the stateless SIP user agent, and may store the call state in a local persistent data store as a browser cookie or other local storage, and/or in a network persistent data store (i.e., in the "cloud"). Accordingly, in the event that the WebRTC client and/or the stateless SIP user agent is terminated, the call state management agent may provide the stored call state to the stateless SIP user agent (or to an alternate stateless SIP user agent). The stateless SIP user agent may then restore the WebRTC interactive flow based on the stored call state.

In this regard, in one embodiment, a method for providing reliable SIP signaling for WebRTC interactive flows is provided. The method comprises establishing, via a stateless SIP user agent executing on a first web server, a WebRTC interactive flow between a WebRTC client executing on a computing device and a remote endpoint. The method further comprises receiving, by the WebRTC client, a call state from the stateless SIP user agent, the call state indicating a current state of the WebRTC interactive flow. The method additionally comprises storing, by the WebRTC client, the call state. In this manner, the call state of the WebRTC interactive flow may be accessible for restoring the WebRTC interactive flow in the event of an unexpected termination of the WebRTC client and/or the stateless SIP user agent.

In another embodiment, a system for providing reliable SIP signaling for WebRTC interactive flows is provided. The system comprises at least one communications interface, and a first web server executing a stateless SIP user agent. The system further comprises a computing device associated with the at least one communications interface and communicatively coupled to the stateless SIP user agent, the computing device executing a WebRTC client comprising a call state management agent. The WebRTC client is configured to establish a WebRTC interactive flow with a remote endpoint via the stateless SIP user agent. The call state management agent is configured to receive a call state from the stateless SIP user agent, the call state indicating a current state of the WebRTC interactive flow. The call state management agent is further configured to store the call state.

In another embodiment, a non-transitory computer-readable medium is provided. The non-transitory computer-readable medium has stored thereon computer-executable instructions to cause a processor to implement a method comprising establishing, via a stateless SIP user agent, a WebRTC interactive flow between a WebRTC client and a remote endpoint. The method implemented by the computer-executable instructions further comprises receiving, by the WebRTC client, a call state from the stateless SIP user agent, the call state indicating a current state of the WebRTC interactive flow. The method implemented by the computer-executable instructions additionally comprises storing, by the WebRTC client, the call state.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
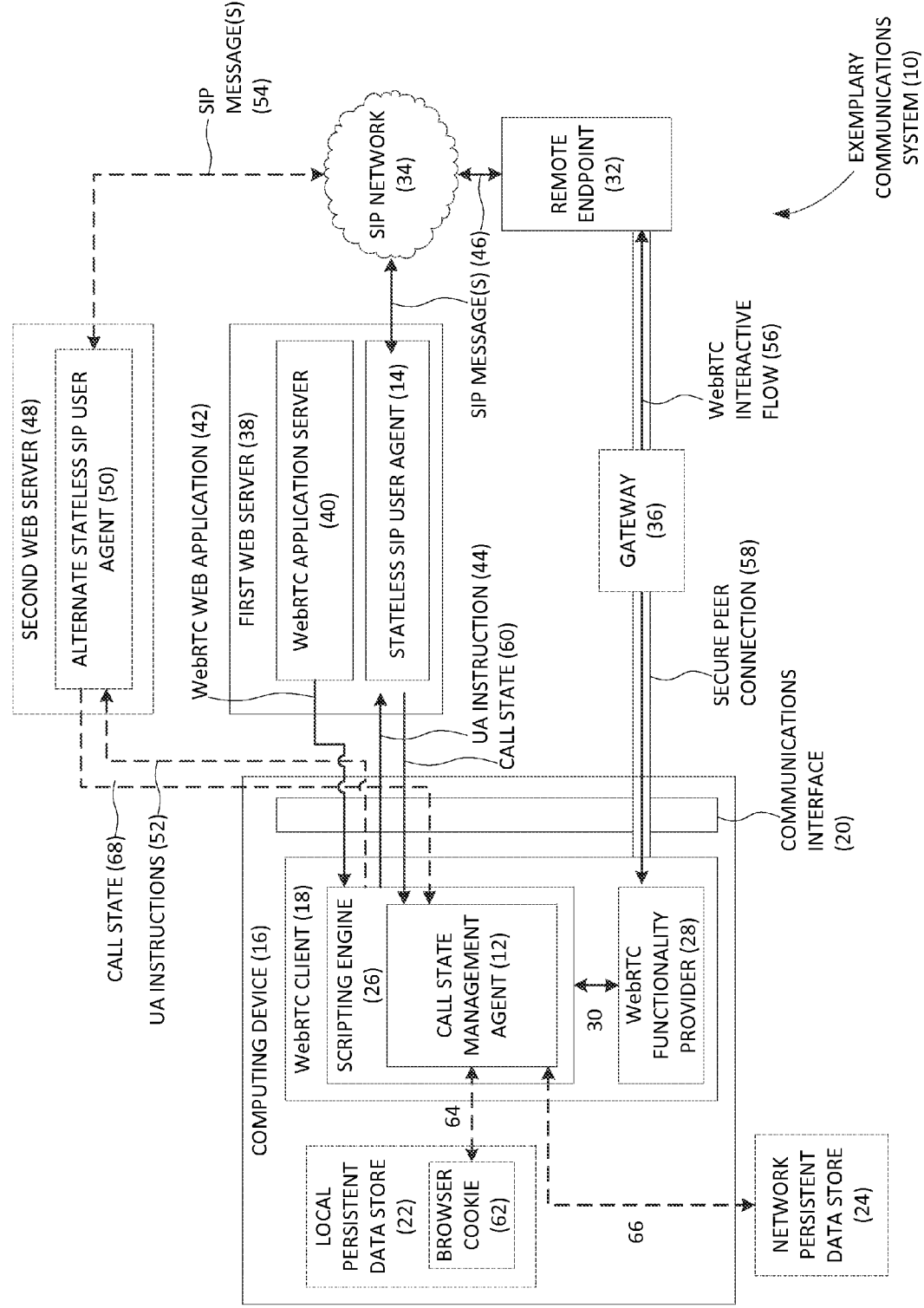
FIG. 1 is a conceptual diagram illustrating an exemplary topology of a Web Real-Time Communications (WebRTC) interactive flow between a WebRTC client and a remote endpoint, including a call state management agent and a stateless SIP user agent.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide reliable Session Initiation Protocol (SIP) signaling for Web Real-Time Communications (WebRTC) interactive flows. Related methods, systems, and computer-readable media are also disclosed. In this regard, some embodiments disclosed herein provide a WebRTC client comprising a call state management agent working in conjunction with a stateless SIP user agent to provide reliable SIP signaling. The WebRTC client may establish a WebRTC interactive flow with a remote endpoint, using the stateless SIP user agent to handle call signaling. As the WebRTC interactive flow progresses, the stateless SIP user agent may generate a call state that encapsulates a current state of the WebRTC interactive flow. The call state management agent may receive the call state from the stateless SIP user agent, and may store the call state in a local persistent data store as a browser cookie or other local storage, and/or in a network persistent data store (i.e., in the "cloud"). Accordingly, in the event that the WebRTC client and/or the stateless SIP user agent is terminated, the call state management agent may provide the stored call state to the stateless SIP user agent (or to an alternate stateless SIP user agent). The stateless SIP user agent may then restore the WebRTC interactive flow based on the stored call state.

In this regard, in one embodiment, a method for providing reliable SIP signaling for WebRTC interactive flows is provided. The method comprises establishing, via a stateless SIP user agent executing on a first web server, a WebRTC interactive flow between a WebRTC client executing on a computing device and a remote endpoint. The method further comprises receiving, by the WebRTC client, a call state from the stateless SIP user agent, the call state indicating a current state of the WebRTC interactive flow. The method additionally comprises storing, by the WebRTC client, the call state. In this manner, the call state of the WebRTC interactive flow may be accessible for restoring the WebRTC interactive flow in the event of an unexpected termination of the WebRTC client and/or the stateless SIP user agent.

FIG. 1 illustrates an exemplary communications system 10 for providing reliable SIP signaling for WebRTC interactive flows as disclosed herein. In particular, the exemplary communications system 10 includes a call state management agent 12 that provides functionality for receiving and storing a call state for a WebRTC interactive flow from a stateless SIP user agent 14, and for providing the call state to the stateless SIP user agent 14 to restore the WebRTC interactive flow. As used herein, a "WebRTC interactive flow" refers to an interactive media flow and/or an interactive data flow that passes between or among two or more endpoints according to WebRTC standards and protocols. As non-limiting examples, an interactive media flow constituting a WebRTC interactive flow may comprise a real-time audio stream and/or a real-time video stream, or other real-time media or data streams.

Before discussing details of the call state management agent 12 and the stateless SIP user agent 14, the establishment of a WebRTC interactive flow using SIP signaling in the communications system 10 of FIG. 1 is first described. In FIG. 1, a computing device 16 executes a WebRTC client 18. Some embodiments of the exemplary communications system 10 may provide that the computing device 16 may be any computing device having network communications capabilities, such as a smartphone, a tablet computer, a dedicated web appliance, a media server, a desktop or server computer, or a purpose-built communications device, as non-limiting examples. The computing device 16 includes a communications interface 20 for physically connecting the computing device 16 to one or more public and/or private networks. The computing device 16 also includes a local persistent data store 22. The local persistent data store 22 may be, for instance, a data storage device such as a hard drive. In some embodiments, the elements of the computing device 16 may be distributed across more than one computing device 16.

The communications system 10 of FIG. 1 may also include a network persistent data store 24, commonly referred to as "cloud" storage. The network persistent data store 24 may comprise a file server or network attached storage (NAS) device that is accessible to the computing device 16 via a network. The network persistent data store 24 may reside within a same public or private network as the computing device 16, or may be located within separate, communicatively coupled public or private networks.

The WebRTC client 18, in the example of FIG. 1, may be a web browser application, a dedicated communications application, or an interface-less application such as a daemon or service application, as non-limiting examples. The WebRTC client 18 comprises a scripting engine 26 and a WebRTC functionality provider 28. The scripting engine 26 enables client-side applications written in a scripting language, such as JavaScript, to be executed within the WebRTC client 18. The scripting engine 26 provides an application programming interface (API) (not shown) to facilitate communications with other functionality providers within the WebRTC client 18, with the computing device 16, and/or with other web clients, computing devices, or web servers. The WebRTC functionality provider 28 of the WebRTC client 18 implements the protocols, codecs, and APIs necessary to enable real-time interactive flows via WebRTC. The scripting engine 26 and the WebRTC functionality provider 28 are communicatively coupled via a set of defined APIs, as indicated by bidirectional arrow 30.

In the example of FIG. 1, the WebRTC client 18 may seek to establish a WebRTC interactive flow with a remote endpoint 32 using SIP signaling via a SIP network 34. In some embodiments, the remote endpoint 32 may be a WebRTC client including elements corresponding to the scripting engine 26 and the WebRTC functionality provider 28 of FIG. 1. Some embodiments may provide that the remote endpoint 32 may be a SIP device such as a SIP phone, and may be implemented as a hardware device or as a SIP client executing on a computing device. In embodiments wherein the remote endpoint 32 comprises a SIP device, the use of a gateway such as a gateway 36 may be required in order to provide interoperability and compatible media and/or flows between the WebRTC client 18 and the remote endpoint 32, as is well known in the art. It is to be understood that SIP call signaling requests and/or responses may be handled by the SIP network 34 on behalf of the remote endpoint 32, or may be received and handled directly by the remote endpoint 32. It is to be further understood that in some embodiments the computing device 16 and the remote endpoint 32 may both be located within a same public or private network, or may be located within separate, communicatively coupled public or private networks.

As seen in FIG. 1, a first web server 38 provides a WebRTC application server 40, which may make a WebRTC web application 42 available for download by the WebRTC client 18. In some embodiments, the WebRTC web application 42 comprises an HTML5/JavaScript web application that provides a rich user interface using HTML5, and uses JavaScript to handle user input and to communicate with the WebRTC application server 40. Once downloaded by the WebRTC client 18, the WebRTC web application 42 may be executed by the scripting engine 26.

Also provided by the first web server 38 is the stateless SIP user agent 14. The stateless SIP user agent 14 may be configured to receive a user agent (UA) instruction 44 from the WebRTC web application 42 for establishing or participating in a WebRTC interactive flow. In some embodiments, the UA instruction 44 may represent a high level abstraction of a call signaling request such as "make call," "accept call," or "drop call," as non-limiting examples. The stateless SIP user agent 14 may map the UA instruction 44 into a SIP message(s) 46, which may be sent to the remote endpoint 32 via the SIP network 34. In some embodiments, the SIP message(s) 46 may include a Hyper Text Transfer Protocol (HTTP) session identifier to allow the stateless SIP user agent 14 to associate future SIP messages 46 received from the SIP network 34 with the WebRTC client 18. The stateless SIP user agent 14 may also map a SIP message(s) 46 received from the SIP network 34 into an event representing a high level abstraction of a call signaling event such as "new incoming call," "call dropped," or "call accepted," as non-limiting examples. Such events may be used by the stateless SIP user agent 14 to maintain an awareness of a current state of a WebRTC interactive flow.

Some embodiments may also provide a second web server 48 executing an alternate stateless SIP user agent 50. The alternate stateless SIP user agent 50 may act as a backup for the stateless SIP user agent 14 in the event that the stateless SIP user agent 14 becomes unavailable. Accordingly, the alternate stateless SIP user agent 50 may receive UA instructions 52 from the scripting engine 26 of the WebRTC client 18, and may exchange SIP messages 54 with the remote endpoint 32 via the SIP network 34. In some embodiments, the first web server 38 and the second web server 48 may each be a single server, while some embodiments may provide that the first web server 38 and/or the second web server 48 comprise multiple servers that are communicatively coupled to each other. It is to be understood that the first web server 38 and/or the second web server 48 may reside within the same public or private network as the computing device 16 and/or the remote endpoint 32, or may be located within a separate, communicatively coupled public or private network.

FIG. 1 further illustrates a topology that results from establishing a WebRTC interactive flow 56 between the WebRTC client 18 and the remote endpoint 32. To establish the WebRTC interactive flow 56, the WebRTC client 18 (and the remote endpoint 32, if it is also a WebRTC client) downloads the WebRTC web application 42 from the WebRTC application server 40. The WebRTC client 18 and the remote endpoint 32 then engage in an initiation dialogue (not shown) via the stateless SIP user agent 14. In some embodiments, the initiation dialogue may comprise a WebRTC offer/answer exchange using Session Description Protocol (SDP) objects. Data exchanged during the initiation dialogue may be used to determine the media types and capabilities for the WebRTC interactive flow 56. Once the initiation dialogue is complete, the WebRTC interactive flow 56 may be established via a secure peer connection 58 between the WebRTC client 18 and the remote endpoint 32. It is to be understood that the WebRTC interactive flow 56 may be initiated by the WebRTC client 18 or by the remote endpoint 32. Some embodiments may provide that the WebRTC interactive flow 56 may pass directly between the WebRTC client 18 and the remote endpoint 32, may be relayed by an intermediate network element such as a media server or Traversal Using Relays around Network Address Translator (TURN) server (not shown), and/or may be routed through a gateway such as the gateway 36.

In a typical WebRTC communications scenario wherein SIP signaling is provided by a SIP user agent executing on a web server, the web-based SIP user agent scenario may maintain a call state that indicates a current state of a WebRTC interactive flow. In other words, the SIP user agent is stateful. However, the use of such a SIP user agent is inconsistent with the stateless nature of a typical web server. Moreover, a stateful SIP user agent may present load-balancing and reliability issues. For example, in the event of a termination of the SIP user agent or the web server executing it (caused by, e.g., a web server crash), the current state of any ongoing WebRTC interactive flows may be lost, making restoration of the WebRTC interactive flows and/or corresponding SIP signaling difficult or impossible.

In this regard, the call state management agent 12 and the stateless SIP user agent 14 of FIG. 1 are provided. According to embodiments described herein, the stateless SIP user agent 14 may incorporate SIP responses received from the SIP network 34 and/or the remote endpoint 32 into a call state 60. The call state 60 includes sufficient information for the stateless SIP user agent 14 to restore the WebRTC interactive flow 56 in the event of an interruption in communications. In some embodiments, the call state 60 may include SIP dialog information, SIP transaction information, and/or a HTTP session identifier, as non-limiting examples. The call state 60 is received by the call state management agent 12, and is stored by the call state management agent 12 for later access. According to some embodiments described herein, the call state management agent 12 receives the call state 60 from the stateless SIP user agent 14 with each occurrence of an event corresponding to a change in state of the WebRTC interactive flow 56.

In some embodiments, the call state management agent 12 may store the call state 60 in the local persistent data store 22 as a browser cookie 62 or as other local storage, as indicated by bidirectional arrow 64. Some embodiments may provide that the call state management agent 12 may store the call state 60 in the network persistent data store 24 (i.e., "cloud" storage), as shown by bidirectional arrow 66. Storing the call state 60 on the network persistent data store 24 may permit the WebRTC interactive flow 56 to be restored using a different computing device than the computing device 16 with which the WebRTC interactive flow 56 was originally established. According to some embodiments described herein, the call state 60 may be stored in a serialized base64 text representation.

The stored call state 60 may be used to restore the WebRTC interactive flow 56 in the event of a termination (either unexpected or intentional) of the WebRTC client 18. After such a termination, the WebRTC client 18 may be restarted, and the call state management agent 12 may access the stored call state 60 from the local persistent data store 22 and/or the network persistent data store 24. The call state management agent 12 may then provide the stored call state 60 to the stateless SIP user agent 14. Because the stored call state 60 contains information regarding the last known state of the WebRTC interactive flow 56, the stateless SIP user agent 14 may restore the WebRTC interactive flow 56 between the WebRTC client 18 and the remote endpoint 32 based on the stored call state 60. In some embodiments wherein the call state 60 is stored in the network persistent data store 24, the WebRTC interactive flow 56 may be restored using a different computing device than the computing device 16 with which the WebRTC interactive flow 56 was originally established.

The stored call state 60 may be also be used to restore the WebRTC interactive flow 56 in the event of a termination of the stateless SIP user agent 14. After such a termination, the WebRTC client 18 may identify and contact the alternate stateless SIP user agent 50, based on load-balancing and/or web server failover techniques known in the art. The call state management agent 12 may then access the stored call state 60 from the local persistent data store 22 and/or the network persistent data store 24, and provide the stored call state 60 to the alternate stateless SIP user agent 50. As the stored call state 60 contains information regarding the last known state of the WebRTC interactive flow 56, the alternate stateless SIP user agent 50 may restore the WebRTC interactive flow 56 between the WebRTC client 18 and the remote endpoint 32 based on the stored call state 60. Once the WebRTC interactive flow 56 has been restored, the alternate stateless SIP user agent 50 may provide a call state 68 to the call state management agent 12 in the manner described above with respect to the stateless SIP user agent 14 and the call state 60.

Figure 2:
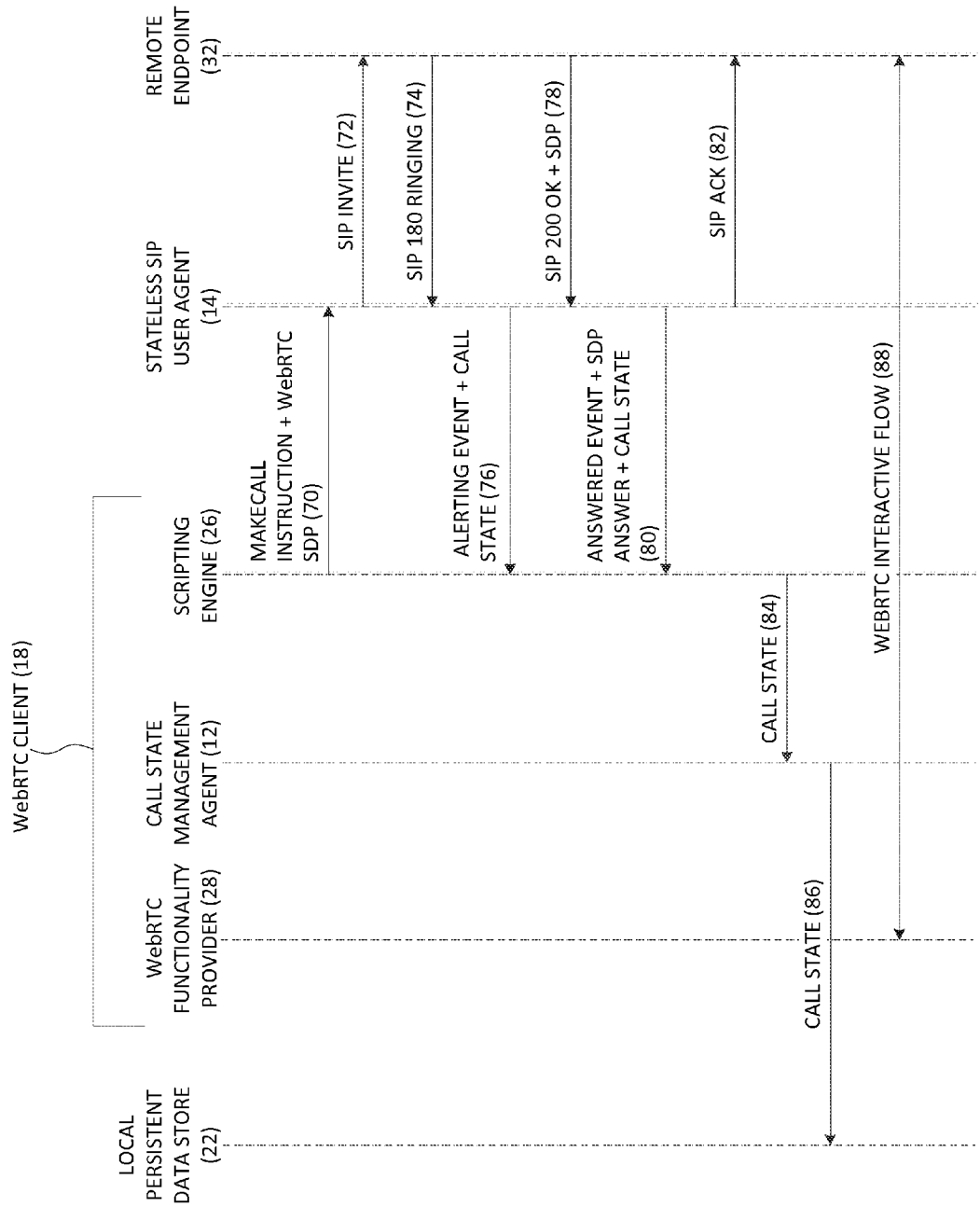
FIG. 2 is a diagram illustrating exemplary communications flows during establishment of a WebRTC interactive flow between the WebRTC client and the remote endpoint via the stateless SIP user agent of FIG. 1.

To illustrate exemplary communications flows during an establishment of a WebRTC interactive flow between the WebRTC client 18 and the remote endpoint 32 via the stateless SIP user agent 14 of FIG. 1, FIG. 2 is provided. In FIG. 2, the local persistent data store 22, the WebRTC client 18, the stateless SIP user agent 14, and the remote endpoint 32 of FIG. 1 are each represented by vertical dotted lines. The WebRTC functionality provider 28, the call state management agent 12, and the scripting engine 26 of the WebRTC client 18 are shown as separate elements to better illustrate communications flows therebetween. It is to be understood that SIP signaling messages sent from the stateless SIP user agent 14 are communicated to the remote endpoint 32 via the SIP network 34 according to techniques well-known in the art. It is to be further understood that the WebRTC client 18 has downloaded the WebRTC web application 42 (e.g., an HTML5/JavaScript WebRTC web application) from the WebRTC application server 40, and that the WebRTC web application 42 is being executed by the scripting engine 26.

In the example of FIG. 2, the establishment of a WebRTC interactive flow begins with the scripting engine 26 of the WebRTC client 18 sending a MakeCall instruction to the stateless SIP user agent 14, as indicated by arrow 70. It is to be understood that the MakeCall instruction and other user agent instructions sent by the WebRTC client 18 to the stateless SIP user agent 14 may be custom instructions specific to the WebRTC web application 42 and/or the stateless SIP user agent 14. The MakeCall instruction is accompanied by a WebRTC SDP object that represents an "offer," and that specifies the media types and capabilities that the WebRTC client 18 supports and prefers for use in the WebRTC interactive flow.

Upon receiving the MakeCall instruction, the stateless SIP user agent 14 sends a SIP INVITE message to the remote endpoint 32, as shown by arrow 72. The remote endpoint 32 responds with a SIP 180 RINGING message to the stateless SIP user agent 14, as indicated by arrow 74. The stateless SIP user agent 14 sends an Alerting event, accompanied by a call state, to the scripting engine 26 of the WebRTC client 18, as shown by arrow 76. As with the user agent instructions, the events sent by the stateless SIP user agent 14 to the WebRTC client 18 may be custom events specific to the WebRTC web application 42 and/or the stateless SIP user agent 14. Note that, at this point, because a WebRTC interactive flow has not yet been established, the call state may not be stored by the call state management agent 12. Once the remote endpoint 32 determines to participate in the WebRTC interactive flow, the remote endpoint 32 sends a SIP 200 OK message to the stateless SIP user agent 14, as indicated by arrow 78. The SIP 200 OK message is accompanied by an SDP object that represents an "answer," and that indicates which of the offered media types and capabilities are supported and acceptable by the remote endpoint 32 for the WebRTC interactive flow.

After receiving the SIP 200 OK message, the stateless SIP user agent 14 sends an Answered event along with both the SDP object and a call state to the scripting engine 26, as indicated by arrow 80. The call state may include SIP dialog information, SIP transaction information, and/or an HTTP session identifier, as non-limiting examples. The stateless SIP user agent 14 sends a SIP ACK message to the remote endpoint 32 to acknowledge receipt of the SIP 200 OK message, as shown by arrow 82. The scripting engine 26 then passes the call state received from the stateless SIP user agent 14 to the call state management agent 12, as shown by arrow 84. The call state management agent 12 then stores the call state in the local persistent data store 22, as indicated by arrow 86. In some embodiments, the call state management agent 12 may store the call state in a "cloud" data store, such as the network persistent data store 24 of FIG. 1, instead of or in addition to storing the call state in the local persistent data store 22.

The WebRTC functionality provider 28 and the remote endpoint 32 then proceed with establishing a WebRTC interactive flow with one another, as shown by bidirectional arrow 88. Establishment of the WebRTC interactive flow may include "hole punching" using protocols such as Interactive Connectivity Establishment (ICE) to determine the best way to establish direct communications between the WebRTC client 18 and the remote endpoint 32. Establishment of the WebRTC interactive flow may also include key negotiations to establish a secure peer connection between the WebRTC client 18 and the remote endpoint 32. As noted above with respect to FIG. 1, the WebRTC interactive flow may pass directly between the WebRTC client 18 and the remote endpoint 32, may be relayed by an intermediate network element such as a media server or TURN server, and/or may be routed through a gateway such as the gateway 36 of FIG. 1.

Figure 3:
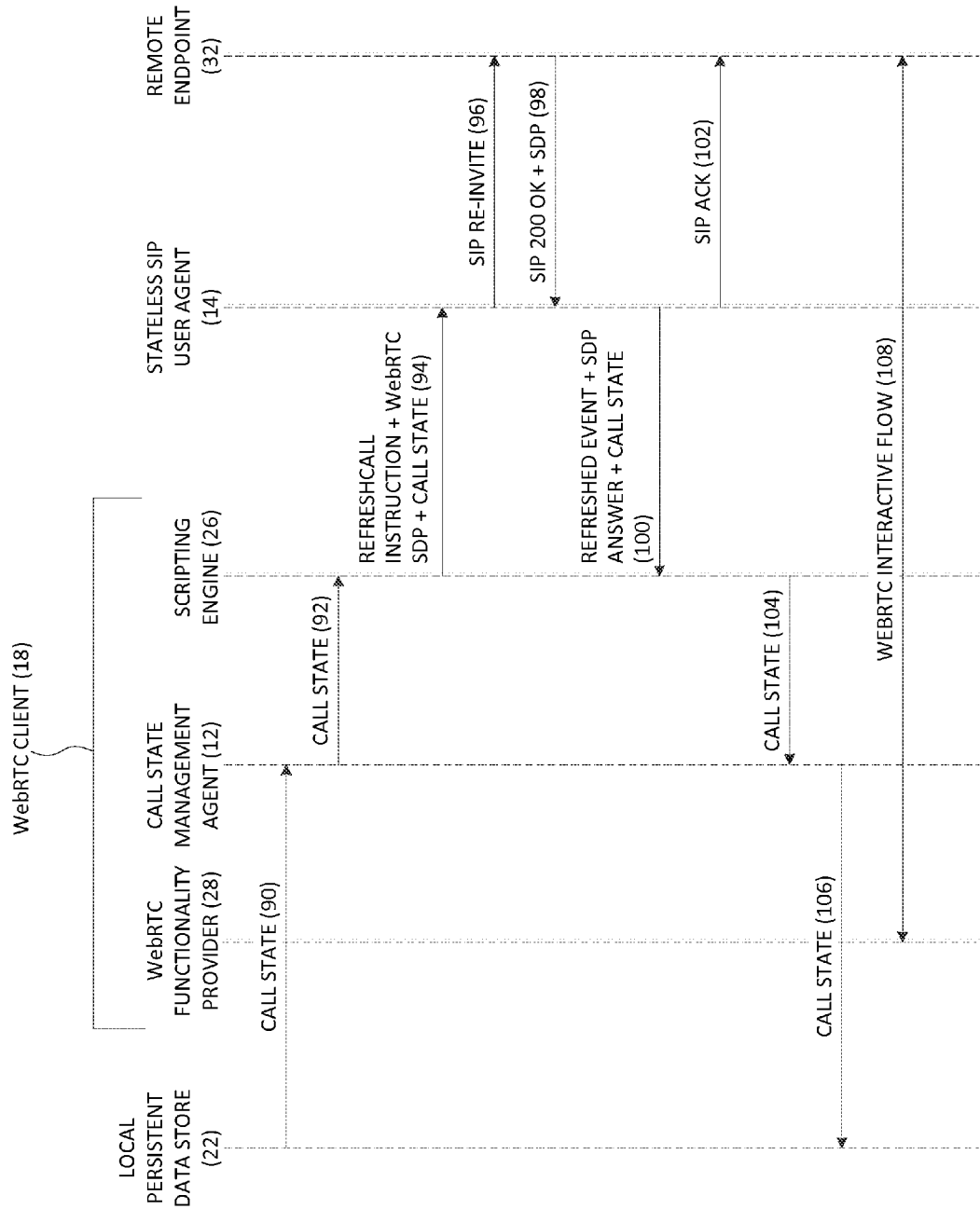
FIG. 3 is a diagram illustrating exemplary communications flows during restoration of a WebRTC interactive flow following a termination of the WebRTC client of FIG. 1, based on a stored call state.

As discussed above, a stored call state may be used to restore a WebRTC interactive flow in the event that a WebRTC client is terminated (either unexpectedly by a crash of the WebRTC client, or intentionally by a user desiring to restore the WebRTC interactive flow using a different computing device). In this regard, FIG. 3 illustrates exemplary communications flows during restoration of a WebRTC interactive flow following a termination of the WebRTC client 18 of FIG. 1, based on a stored call state. As in FIG. 2, the local persistent data store 22, the WebRTC client 18, the stateless SIP user agent 14, and the remote endpoint 32 of FIG. 1 are each represented by vertical dotted lines. For the sake of clarity, the WebRTC functionality provider 28, the call state management agent 12, and the scripting engine 26 of the WebRTC client 18 are illustrated as separate elements. It is to be understood that SIP signaling messages sent from the stateless SIP user agent 14 are communicated to the remote endpoint 32 via the SIP network 34 according to techniques well-known in the art. It is to be further understood that the WebRTC client 18 has downloaded the WebRTC web application 42 (e.g., an HTML5/JavaScript WebRTC web application) from the WebRTC application server 40, and that the WebRTC web application 42 is being executed by the scripting engine 26.

The exemplary communications flows illustrated by FIG. 3 begin immediately after the WebRTC client 18 has been restarted, and the WebRTC web application 42 has been downloaded and executed by the scripting engine 26. The call state management agent 12 of the WebRTC client 18 accesses the call state stored in the local persistent data store 22, as indicated by arrow 90. In some embodiments, the call state may be stored in the local persistent data store 22 as a browser cookie, such as the browser cookie 62 of FIG. 1, accessible to the WebRTC client 18. Some embodiments may provide that the call state management agent 12 accesses the call state stored in a "cloud" data store, such as the network persistent data store 24 of FIG. 1, instead of or in addition to storing the call state in the local persistent data store 22. The call state management agent 12 then passes the call state to the scripting engine 26, as shown by arrow 92.

The scripting engine 26 issues a RefreshCall instruction, accompanied by a WebRTC SDP object and the call state, to the stateless SIP user agent 14, as indicated by arrow 94. In some embodiments, the scripting engine 26 may automatically issue the RefreshCall instruction after determining, based on the call state, that a previous WebRTC interactive flow was terminated. The WebRTC SDP object that is sent with the RefreshCall instruction represents an "offer," and specifies the media types and capabilities that the WebRTC client 18 supports and prefers for use in the restored WebRTC interactive flow.

Upon receiving the RefreshCall command, the WebRTC SDP object, and the call state, the stateless SIP user agent 14 sends a SIP RE-INVITE command to the remote endpoint 32 based on the call state, as shown by arrow 96. As noted above, the call state contains information regarding the last known state of the WebRTC interactive flow, and may comprise SIP dialog information, SIP transaction information, and/or an HTTP session identifier, as non-limiting examples. The remote endpoint 32 responds by sending a SIP 200 OK message to the stateless SIP user agent 14, as indicated by arrow 98. The SIP 200 OK message is accompanied by an SDP object that represents an "answer," and that indicates which of the offered media types and capabilities are supported and acceptable by the remote endpoint 32 for the restored WebRTC interactive flow.

After receiving the SIP 200 OK message, the stateless SIP user agent 14 sends a Refreshed event along with the SDP object and a call state to the scripting engine 26, as indicated by arrow 100. The stateless SIP user agent 14 sends a SIP ACK message to the remote endpoint 32 to acknowledge receipt of the SIP 200 OK message, as shown by arrow 102. The scripting engine 26 then passes the call state received from the stateless SIP user agent 14 to the call state management agent 12, as indicated by arrow 104. The call state management agent 12 stores the call state in the local persistent data store 22, as shown by arrow 106. In some embodiments, the call state management agent 12 may store the call state in a "cloud" data store, such as the network persistent data store 24 of FIG. 1, instead of or in addition to storing the call state in the local persistent data store 22.

The WebRTC functionality provider 28 and the remote endpoint 32 then restore a WebRTC interactive flow between one another (as shown by bidirectional arrow 108), including hole punching and key negotiations as necessary. As noted above with respect to FIG. 1, the WebRTC interactive flow may pass directly between the WebRTC client 18 and the remote endpoint 32, may be relayed by an intermediate network element such as a media server or TURN server, and/or may be routed through a gateway such as the gateway 36 of FIG. 1.

Figure 4:
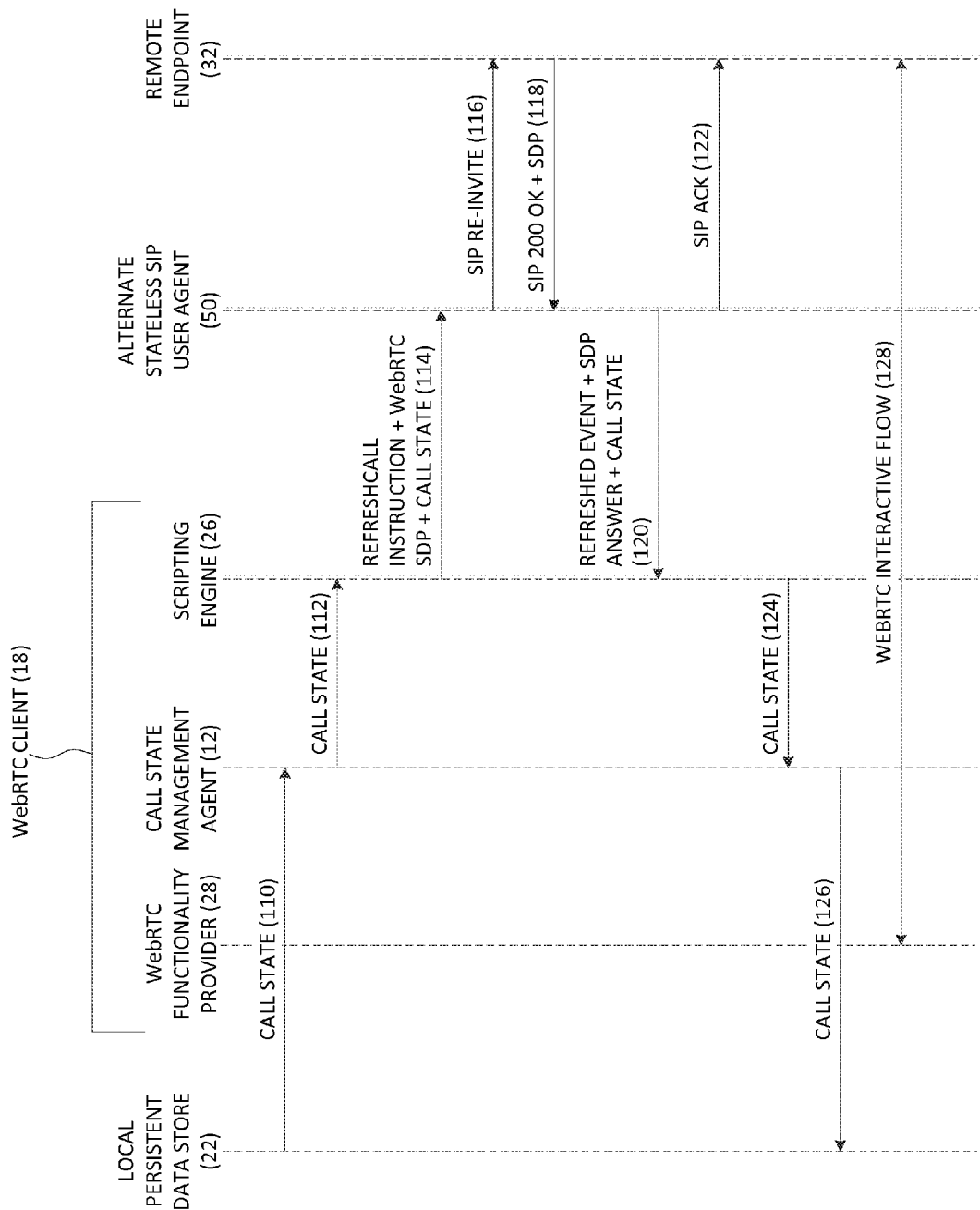
FIG. 4 is a diagram illustrating exemplary communications flows during restoration of a WebRTC interactive flow following a termination of the stateless SIP user agent of FIG. 1, based on a stored call state.

A stored call state may also be used to restore a WebRTC interactive flow in the event that a stateless SIP user agent is terminated. Accordingly, FIG. 4 illustrates exemplary communications flows that may occur during restoration of a WebRTC interactive flow following a termination of the stateless SIP user agent 14 of FIG. 1, based on a stored call state. These exemplary communications flows may result from an unexpected termination of the stateless SIP user agent 14 (e.g., a "crash") or of the first web server 38, as non-limiting examples. In FIG. 4, the local persistent data store 22, the WebRTC client 18, the alternate stateless SIP user agent 50, and the remote endpoint 32 of FIG. 1 are each represented by vertical dotted lines. The WebRTC functionality provider 28, the call state management agent 12, and the scripting engine 26 of the WebRTC client 18 are illustrated as separate elements to better illustrate communications flows therebetween. It is to be understood that SIP signaling messages sent from the alternate stateless SIP user agent 50 are communicated to the remote endpoint 32 via the SIP network 34 according to techniques well-known in the art. It is to be further understood that the WebRTC client 18 has downloaded the WebRTC web application 42 (e.g, an HTML5/JavaScript WebRTC web application) from the WebRTC application server 40, and that the WebRTC web application 42 is being executed by the scripting engine 26.

The exemplary communications flows illustrated by FIG. 4 begin upon a determination by the WebRTC client 18 that the stateless SIP user agent 14 has terminated. The call state management agent 12 of the WebRTC client 18 accesses the call state stored in the local persistent data store 22, as indicated by arrow 110. In some embodiments, the call state may be stored in the local persistent data store 22 as a browser cookie, such as the browser cookie 62 of FIG. 1, accessible to the WebRTC client 18. Some embodiments may provide that the call state management agent 12 accesses the call state stored in a "cloud" data store, such as the network persistent data store 24 of FIG. 1, instead of or in addition to storing the call state in the local persistent data store 22. The call state management agent 12 then passes the call state to the scripting engine 26, as shown by arrow 112.

At this point, the WebRTC client 18 identifies the alternate stateless SIP user agent 50, using load-balancing and/or web server failover techniques known in the art, to contact in order to restore the WebRTC interactive flow. Upon identifying the alternate stateless SIP user agent 50, the scripting engine 26 issues a RefreshCall command, accompanied by a WebRTC SDP object and the call state, to the alternate stateless SIP user agent 50, as indicated by arrow 114. In some embodiments, the scripting engine 26 may automatically issue the RefreshCall command after determining, based on the call state, that a previous WebRTC interactive flow was terminated. The WebRTC SDP object that accompanies the RefreshCall command represents an "offer," and specifies the media types and capabilities that the WebRTC client 18 supports and prefers for use in the restored WebRTC interactive flow.

Upon receiving the RefreshCall command, the WebRTC SDP object, and the call state, the alternate stateless SIP user agent 50 sends a SIP RE-INVITE command to the remote endpoint 32 based on the call state, as shown by arrow 116. In some embodiments, the call state contains information regarding the last known state of the WebRTC interactive flow, and may comprise SIP dialog information, SIP transaction information, and/or an HTTP session identifier, as non-limiting examples. The remote endpoint 32 responds with a SIP 200 OK message sent to the alternate stateless SIP user agent 50, as indicated by arrow 118. The SIP 200 OK message is accompanied by a WebRTC SDP object that represents an "answer," and that indicates which of the offered media types and capabilities are supported and acceptable by the remote endpoint 32 for the restored WebRTC interactive flow.

After receiving the SIP 200 OK message, the alternate stateless SIP user agent 50 sends a Refreshed event along with the SDP object and a call state to the scripting engine 26, as indicated by arrow 120. The alternate stateless SIP user agent 50 sends a SIP ACK message to the remote endpoint 32 to acknowledge receipt of the SIP 200 OK message, as shown by arrow 122. The scripting engine 26 passes the call state to the call state management agent 12, as shown by arrow 124. The call state management agent 12 then stores the call state in the local persistent data store 22, as indicated by arrow 126. In some embodiments, the call state management agent 12 may store the call state in a "cloud" data store, such as the network persistent data store 24 of FIG. 1, instead of or in addition to storing the call state in the local persistent data store 22.

The WebRTC functionality provider 28 and the remote endpoint 32 then restore a WebRTC interactive flow between one another (as shown by bidirectional arrow 128), including hole punching and key negotiations as necessary. As noted above with respect to FIG. 1, the WebRTC interactive flow may pass directly between the WebRTC client 18 and the remote endpoint 32, may be relayed by an intermediate network element such as a media server or TURN server, and/or may be routed through a gateway such as the gateway 36 of FIG. 1.

Figure 5:
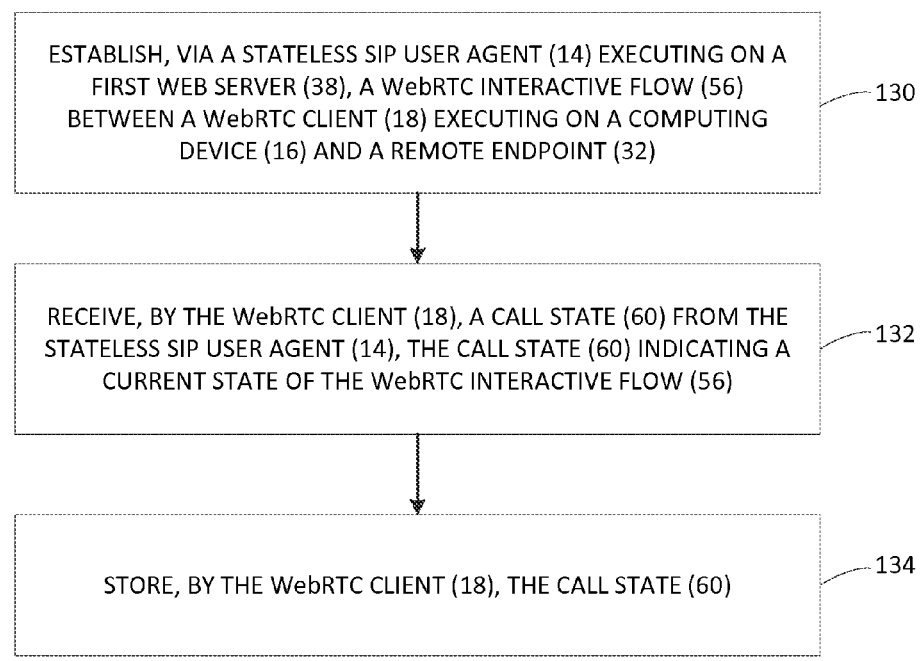
FIG. 5 is a flowchart illustrating exemplary operations for providing reliable Session Initiation Protocol (SIP) signaling for WebRTC interactive flows.

FIG. 5 is a flowchart provided to illustrate exemplary operations for providing reliable SIP signaling for WebRTC interactive flows. For the sake of clarity, elements of FIG. 1 are referenced in describing FIG. 5. In FIG. 5, operations begin with the WebRTC client 18 establishing, via the stateless SIP user agent 14 executing on the first web server 38, the WebRTC interactive flow 56 between the WebRTC client 18 executing on the computing device 16 and a remote endpoint 32 (block 130). In some embodiments, establishing the WebRTC interactive flow 56 may include a WebRTC offer/answer exchange, hole punching, and key negotiations, as non-limiting examples.

The WebRTC client 18 (in particular, the call state management agent 12) next receives a call state 60 from the stateless SIP user agent 14 (block 132). The call state 60 indicates a current state of the WebRTC interactive flow 56, and may comprise SIP dialog information, SIP transaction information, and/or an HTTP session identifier, as non-limiting examples. In some embodiments, the WebRTC client 18 receives a call state 60 from the stateless SIP user agent 14 with each occurrence of an event corresponding to a change in state of the WebRTC interactive flow 56.

The WebRTC client 18 then stores the call state 60 (block 134). Some embodiments may provide that the call state 60 is stored in the local persistent data store 22 as a browser cookie 62 accessible to the WebRTC client 18. In some embodiments, the WebRTC client 18 may store the call state 60 on a network persistent data store 24 instead of or in addition to storing the call state 60 on the local persistent data store 22. Storing the call state 60 on the network persistent data store 24 may permit the WebRTC interactive flow 56 to be restored using a different computing device than the computing device 16 with which the WebRTC interactive flow 56 was originally established.

Figure 6A:
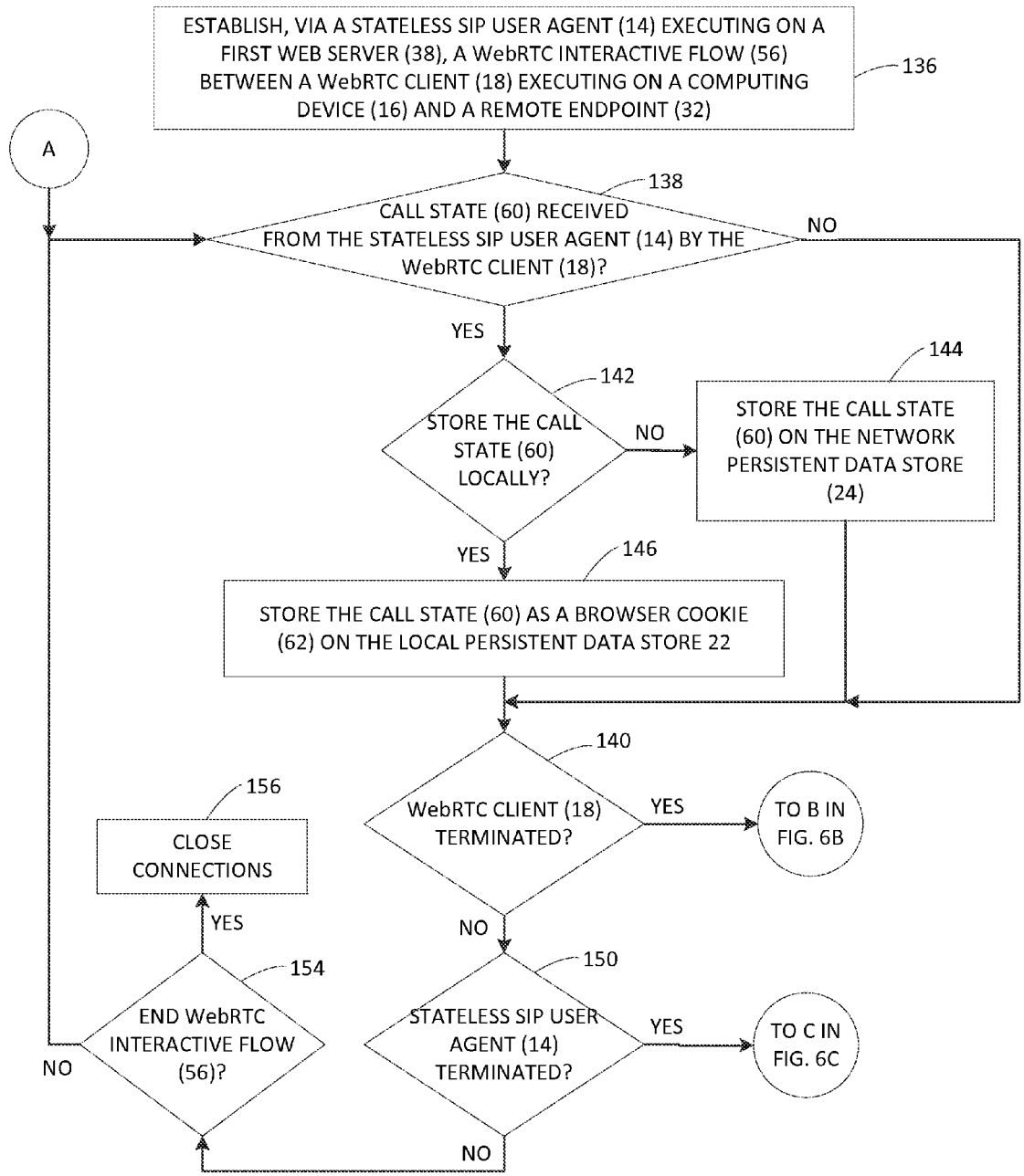
FIGS. 6A-6C are flowcharts illustrating more detailed exemplary operations for providing reliable SIP signaling for WebRTC interactive flows, including restoring a WebRTC interactive flow following a termination of the WebRTC client and/or the stateless SIP user agent of FIG. 1, based on a stored call state.
Figure 6B:
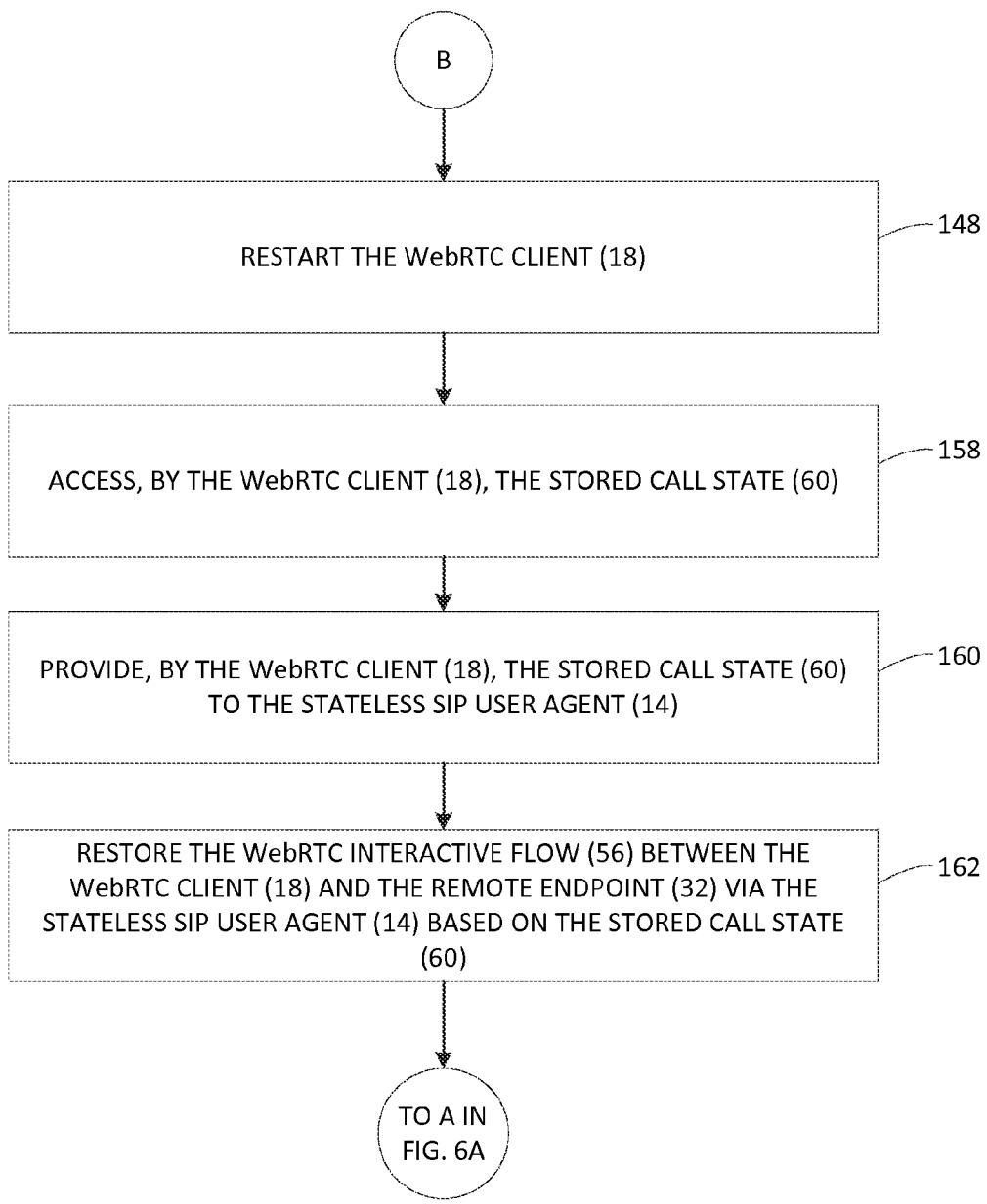
Figure 6C:
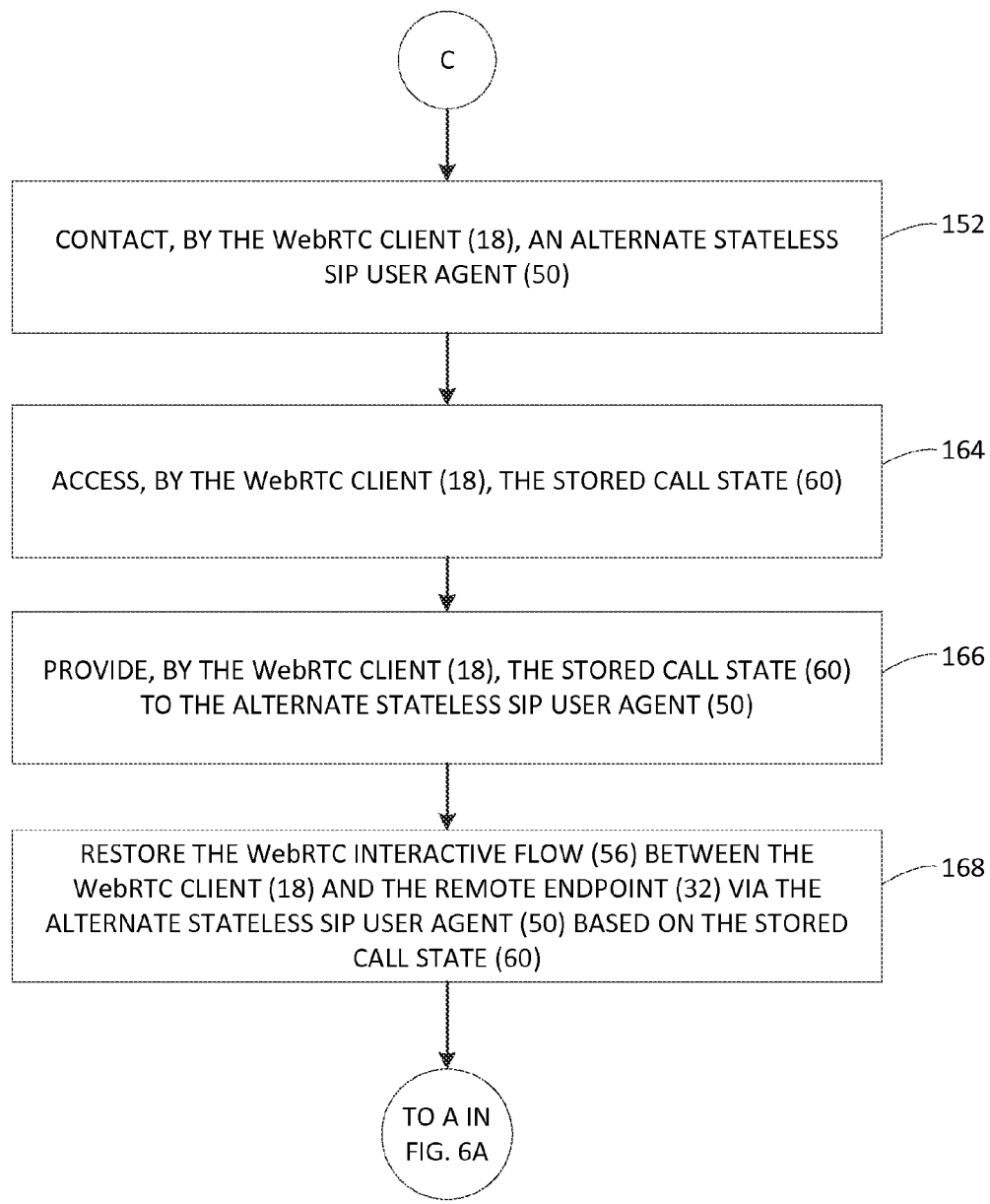

FIGS. 6A-6C are flowcharts providing more detailed exemplary operations for providing reliable SIP signaling for WebRTC interactive flows. For the sake of clarity, elements of FIG. 1 are referenced in describing FIGS. 6A-6C. FIG. 6A illustrates exemplary operations for establishing the WebRTC interactive flow 56 between the WebRTC client 18 and the remote endpoint 32 via the stateless SIP user agent 14, and receiving and storing the call state 60. FIG. 6B details exemplary operations for restoring the WebRTC interactive flow 56 following a termination of the WebRTC client 18, based on the stored call state 60.

Similarly, FIG. 6C shows exemplary operations for restoring the WebRTC interactive flow 56 following a termination of the stateless SIP user agent 14, based on the stored call state 60.

In FIG. 6A, operations begin with the WebRTC client 18 establishing, via the stateless SIP user agent 14 executing on the first web server 38, the WebRTC interactive flow 56 between the WebRTC client 18 executing on the computing device 16 and a remote endpoint 32 (block 136). In some embodiments, establishing the WebRTC interactive flow 56 may include an WebRTC offer/answer exchange, hole punching, and key negotiations, as non-limiting examples. The WebRTC client 18 (in particular, the call state management agent 12) determines whether a call state 60 has been received from the stateless SIP user agent 14 by the WebRTC client 18 (block 138). As noted above, the call state 60 may be received from the stateless SIP user agent 14 with each occurrence of an event corresponding to a change in state of the WebRTC interactive flow 56.

If no call state 60 has been received, processing proceeds to block 140 of FIG. 6A. However, if the call state management agent 12 determines at decision block 138 that a call state 60 has been received, the call state management agent 12 determines whether the call state 60 is to be stored locally (block 142). If the call state 60 is not to be stored locally, the call state management agent 12 stores the call state 60 in a network persistent data store 24 (block 144). If the call state management agent 12 determines at decision block 142 that the call state 60 is to be stored locally, the call state 60 is stored as a browser cookie 62 on the local persistent data store 22 (block 146). After the call state 60 is stored, either on the local persistent data store 22 or the network persistent data store 24, processing resumes at block 140.

With continuing reference to FIG. 6A, a determination is made regarding whether the WebRTC client 18 has terminated (block 140). This determination may be made by a user of the WebRTC client 18, or by a computer operating system, application, or process (not shown) monitoring the execution of the WebRTC client 18, as non-limiting examples. If the WebRTC client 18 has terminated, processing resumes at block 148 in FIG. 6B. If it is determined at block 140 that the WebRTC client 18 has not terminated, a finding is made regarding whether the stateless SIP user agent 14 has terminated (block 150). Determining whether the stateless SIP user agent 14 has terminated may be based on detecting an interruption in communications between the WebRTC client 18 and the stateless SIP user agent 14, as a non-limiting example. If it is found at decision block 150 that the stateless SIP user agent 14 has terminated, processing resumes at block 152 in FIG. 6C. If the stateless SIP user agent 14 is still active, processing continues at block 154.

The WebRTC client 18 next determines whether the WebRTC interactive flow 56 should be ended (block 154). As non-limiting examples, a user of the WebRTC client 18 may have indicated a desire to end the WebRTC interactive flow 56, or the call state management agent 12 may have received a call state 60 indicating that the remote endpoint 32 wishes to end the WebRTC interactive flow 56. If the WebRTC interactive flow 56 should be ended, the WebRTC client 18 closes any outstanding connections (block 156). If it is determined at block 154 that the WebRTC interactive flow 56 is ongoing, processing returns to block 138. Processing then continues in this loop defined by the flowchart of FIG. 6A until the WebRTC interactive flow 56 is ended.

As noted above with respect to block 140 of FIG. 6A, a termination of the WebRTC client 18 causes processing to resume at block 148 of FIG. 6B. Referring now to FIG. 6B, the WebRTC client 18 is first restarted (block 148). Restarting the WebRTC client 18 may be carried out by a user of the WebRTC client 18, and/or may be automatically triggered by a computer operating system, application, or process (not shown), as non-limiting examples.

The call state management agent 12 of the WebRTC client 18 then accesses the stored call state 60 (block 158). In some embodiments, accessing the stored call state 60 may comprise reading the call state 60 from the local persistent data store 22 and/or from the network persistent data store 24. The call state management agent 12 of the WebRTC client 18 next provides the stored call state 60 to the stateless SIP user agent 14 (block 160). Some embodiments may provide that the stored call state 60 is provided to the stateless SIP user agent 14 as part of an instruction such as a custom RefreshCall instruction.

Based on the stored call state 60 provided by the call state management agent 12, the stateless SIP user agent 14 restores the WebRTC interactive flow 56 between the WebRTC client 18 and the remote endpoint 32 via the stateless SIP user agent 14 (block 162). For example, the call state 60 may include SIP dialog information, SIP transaction information, and/or an HTTP session identifier that enables the stateless SIP user agent 14 to restore the WebRTC interactive flow 56. Upon the restoration of the WebRTC interactive flow 56, processing returns to block 138 of FIG. 6A.

If it was determined at decision block 150 of FIG. 6A that the stateless SIP user agent 14 has terminated, processing resumes at block 152 of FIG. 6C. With reference to FIG. 6C, the WebRTC client 18 contacts an alternate stateless SIP user agent 50 (block 152). In some embodiments, the WebRTC client 18 may contact the alternate stateless SIP user agent 50 based on load-balancing and/or web server failover techniques known in the art.

The call state management agent 12 of the WebRTC client 18 then accesses the stored call state 60 (block 164). Some embodiments may provide that accessing the stored call state 60 may comprise reading the call state 60 from the local persistent data store 22 and/or from the network persistent data store 24. The call state management agent 12 of the WebRTC client 18 next provides the stored call state 60 to the alternate stateless SIP user agent 50 (block 166). Some embodiments may provide that the stored call state 60 is provided to the alternate stateless SIP user agent 50 as part of an instruction such as a custom RefreshCall instruction.

Based on the stored call state 60 provided by the call state management agent 12, the alternate stateless SIP user agent 50 restores the WebRTC interactive flow 56 between the WebRTC client 18 and the remote endpoint 32 via the alternate stateless SIP user agent 50 (block 168). For example, the call state 60 may include SIP dialog information, SIP transaction information, and/or an HTTP session identifier that enables the alternate stateless SIP user agent 50 to restore the WebRTC interactive flow 56. Upon the restoration of the WebRTC interactive flow 56, processing returns to block 138 of FIG. 6A.

Figure 7:
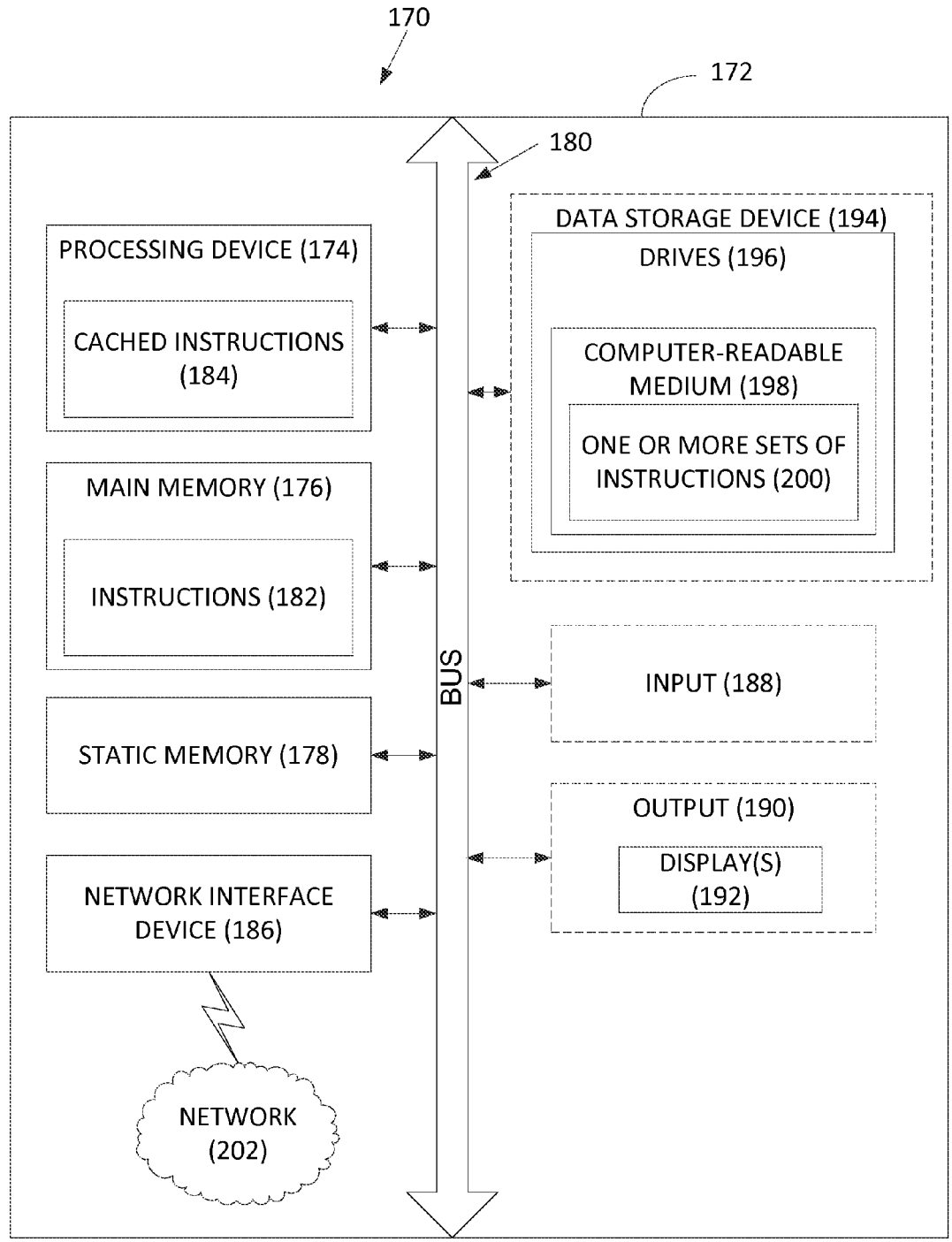
FIG. 7 is a block diagram of an exemplary processor-based system that may include the call state management agent and the stateless SIP user agent of FIG. 1.

FIG. 7 provides a block diagram representation of a processing system 170 in the exemplary form of an exemplary computer system 172 adapted to execute instructions to perform the functions described herein. In some embodiments, the processing system 170 may execute instructions to perform the functions of the call state management agent 12 and/or the stateless SIP user agent 14 of FIG. 1. In this regard, the processing system 170 may comprise the computer system 172, within which a set of instructions for causing the processing system 170 to perform any one or more of the methodologies discussed herein may be executed. The processing system 170 may be connected (as a non-limiting example, networked) to other machines in a local area network (LAN), an intranet, an extranet, or the Internet. The processing system 170 may operate in a client-server network environment, or as a peer machine in a peer-to-peer (or distributed) network environment. While only a single processing system 170 is illustrated, the terms "controller" and "server" shall also be taken to include any collection of machines that individually or jointly execute a set (or multiple sets) of instructions to perform any one or more of the methodologies discussed herein. The processing system 170 may be a server, a personal computer, a desktop computer, a laptop computer, a personal digital assistant (PDA), a computing pad, a mobile device, or any other device and may represent, as non-limiting examples, a server or a user's computer.

The exemplary computer system 172 includes a processing device or processor 174, a main memory 176 (as non-limiting examples, read-only memory (ROM), flash memory, dynamic random access memory (DRAM) such as synchronous DRAM (SDRAM), etc.), and a static memory 178 (as non-limiting examples, flash memory, static random access memory (SRAM), etc.), which may communicate with each other via a bus 180. Alternatively, the processing device 174 may be connected to the main memory 176 and/or the static memory 178 directly or via some other connectivity means.

The processing device 174 represents one or more processing devices such as a microprocessor, central processing unit (CPU), or the like. More particularly, the processing device 174 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 174 is configured to execute processing logic in instructions 182 and/or cached instructions 184 for performing the operations and steps discussed herein.

The computer system 172 may further include a communications interface in the form of a network interface device 186. It also may or may not include an input 188 to receive input and selections to be communicated to the computer system 172 when executing the instructions 182, 184. It also may or may not include an output 190, including but not limited to display(s) 192. The display(s) 192 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 172 may or may not include a data storage device 194 that includes using drive(s) 196 to store the functions described herein in a computer-readable medium 198, on which is stored one or more sets of instructions 200 (e.g., software) embodying any one or more of the methodologies or functions described herein. The functions can include the methods and/or other functions of the processing system 170, a participant user device, and/or a licensing server, as non-limiting examples. The one or more sets of instructions 200 may also reside, completely or at least partially, within the main memory 176 and/or within the processing device 174 during execution thereof by the computer system 172. The main memory 176 and the processing device 174 also constitute machine-accessible storage media. The instructions 182, 184, and/or 200 may further be transmitted or received over a network 202 via the network interface device 186. The network 202 may be an intra-network or an inter-network.

While the computer-readable medium 198 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 200. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing reliable Session Initiation Protocol (SIP) signaling for Web Real-Time Communications (WebRTC) interactive flows, comprising:
   establishing, via a stateless SIP user agent executing on a first web server, a WebRTC interactive flow between a remote endpoint and a WebRTC client executing on a computing device separate from the first server and the remote endpoint;
   receiving, by a call state management agent of the WebRTC client, a call state from the stateless SIP user agent, the call state indicating a current state of the WebRTC interactive flow;
   storing, by the call state management agent of the WebRTC client, the call state; and
   responsive to a termination of the WebRTC interactive flow, restoring, by the stateless SIP user agent, the WebRTC interactive flow between the WebRTC client and remote endpoint using the stored call state from the call state management agent of the WebRTC client.

2. The method of claim 1, further comprising, responsive to a termination of the WebRTC client:
   restarting the WebRTC client;
   accessing, by the call state management agent of the WebRTC client, the stored call state;
   providing, by the call state management agent of the WebRTC client, the stored call state to the stateless SIP user agent; and
   restoring, by the stateless SIP user agent, the WebRTC interactive flow between the WebRTC client and the remote endpoint based on the stored call state provided by the call state management agent of the WebRTC client.

3. The method of claim 1, further comprising, responsive to a termination of the stateless SIP user agent:
   contacting, by the call state management agent of the WebRTC client, an alternate stateless SIP user agent;
   accessing, by the call state management agent of the WebRTC client, the stored call state;
   providing, by the call state management agent of the WebRTC client, the stored call state to the alternate stateless SIP user agent; and
   restoring, by the alternate stateless SIP user agent, the WebRTC interactive flow between the WebRTC client and the remote endpoint based on the stored call state provided by the call state management agent of the WebRTC client.

4. The method of claim 1, wherein storing, by the call state management agent of the WebRTC client, the call state comprises storing the call state in a local persistent data store as a browser cookie accessible to the call state management agent of the WebRTC client.

5. The method of claim 1, wherein storing, by the call state management agent of the WebRTC client, the call state comprises storing the call state in a network persistent data store.

6. The method of claim 1, wherein storing, by the call state management agent of the WebRTC client, the call state comprises storing the call state in a serialized base64 text representation.

7. The method of claim 1, where the call state comprises SIP dialog information, SIP transaction information, or a Hyper Text Transfer Protocol (HTTP) session identifier, or a combination thereof.

8. A system for providing reliable Session Initiation Protocol (SIP) signaling for Web Real-Time Communications (WebRTC) interactive flows, comprising:
   at least one communications interface;
   a first web server executing a stateless SIP user agent; and
   a computing device associated with the at least one communications interface and communicatively coupled to the stateless SIP user agent, the computing device executing a WebRTC client comprising a call state management agent, the WebRTC client configured to establish a WebRTC interactive flow with a remote endpoint via the stateless SIP user agent, the call state management agent configured to receive a call state from the stateless SIP user agent, the call state indicating a current state of the WebRTC interactive flow, and store the call state, and wherein the SIP user agent, in response to a termination of the WebRTC interactive flow, restores the WebRTC interactive flow between the WebRTC client and the remote endpoint using the stored call state from the call state management agent of the WebRTC client.

9. The system of claim 8, wherein the WebRTC client is further configured to, responsive to a termination of the WebRTC client, restart the WebRTC client;
   wherein the call state management agent is further configured to, responsive to restarting the WebRTC client:
      access the stored call state; and
      provide the stored call state to the stateless SIP user agent; and
   wherein the stateless SIP user agent is further configured to restore the WebRTC interactive flow between the WebRTC client and the remote endpoint based on the stored call state provided by the call state management agent of the WebRTC client.

10. The system of claim 8, further comprising a second web server executing an alternate stateless SIP user agent;
    wherein the WebRTC client is further configured to, responsive to a termination of the stateless SIP user agent, contact the alternate stateless SIP user agent;
       wherein the call state management agent is further configured to:
          access the stored call state; and
          provide the stored call state to the alternate stateless SIP user agent; and
       wherein the alternate stateless SIP user agent is configured to restore the WebRTC interactive flow between the WebRTC client and the remote endpoint based on the stored call state provided by the call state management agent of the WebRTC client.

11. The system of claim 8, wherein the call state management agent is configured to store the call state by storing the call state in a local persistent data store as a browser cookie accessible to the WebRTC client.

12. The system of claim 8, further comprising a network persistent data store;
    wherein the call state management agent is configured to store the call state by storing the call state in the network persistent data store.

13. The system of claim 8, wherein the call state management agent is configured to store the call state by storing the call state in a serialized base64 text representation.

14. A non-transitory computer-readable medium having stored thereon computer-executable instructions to cause a processor to implement a method, comprising:
    establishing, via a stateless SIP user agent executing on a first web server, a WebRTC interactive flow between a remote endpoint and a WebRTC client executing on a computing device separate from the first server and the remote endpoint;

receiving, by a call state management agent of the WebRTC client, a call state from the stateless SIP user agent, the call state indicating a current state of the WebRTC interactive flow;

storing, by the call state management agent of the WebRTC client, the call state; and responsive to a termination of the WebRTC interactive flow, restoring, by the stateless SIP user agent, the WebRTC interactive flow between the WebRTC client and remote endpoint using the stored call state from the call state management agent of the WebRTC client.

15. The non-transitory computer-readable medium of claim 14 having stored thereon the computer-executable instructions to cause the processor to implement the method, further comprising, responsive to a termination of the WebRTC client:

restarting the WebRTC client;

accessing, by the call state management agent of the WebRTC client, the stored call state;

providing, by the call state management agent of the WebRTC client, the stored call state to the stateless SIP user agent; and restoring, by the stateless SIP user agent, the WebRTC interactive flow between the WebRTC client and the remote endpoint based on the stored call state provided by the call state management agent of the WebRTC client.

16. The non-transitory computer-readable medium of claim 14 having stored thereon the computer-executable instructions to cause the processor to implement the method, further comprising, responsive to a termination of the stateless SIP user agent:

contacting, by the call state management agent of the WebRTC client, an alternate stateless SIP user agent;

accessing, by the call state management agent of the WebRTC client, the stored call state;

providing, by the call state management agent of the WebRTC client, the stored call state to the alternate stateless SIP user agent; and restoring, by the alternate stateless SIP user agent, the WebRTC interactive flow between the WebRTC client and the remote endpoint based on the stored call state provided by the call state management agent of the WebRTC client.

17. The non-transitory computer-readable medium of claim 14 having stored thereon the computer-executable instructions to cause the processor to implement the method, wherein storing, by the call state management agent of the WebRTC client, the call state comprises storing the call state in a local persistent data store as a browser cookie accessible to the call state management agent of the WebRTC client.

18. The non-transitory computer-readable medium of claim 14 having stored thereon the computer-executable instructions to cause the processor to implement the method, wherein storing, by the call state management agent of the WebRTC client, the call state comprises storing the call state in a network persistent data store.

19. The non-transitory computer-readable medium of claim 14 having stored thereon the computer-executable instructions to cause the processor to implement the method, wherein storing, by the call state management agent of the WebRTC client, the call state comprises storing the call state in a serialized base64 text representation.

20. The non-transitory computer-readable medium of claim 14 having stored thereon the computer-executable instructions to cause the processor to implement the method, wherein the call state comprises SIP dialog information, SIP transaction information, or a Hyper Text Transfer Protocol (HTTP) session identifier, or a combination thereof.

* * * * *